Oct. 28, 1952 T. C. POULTER 2,615,524
SEISMIC EXPLORATION EMPLOYING ELEVATED CHARGES
Filed July 2, 1949 5 Sheets-Sheet 1
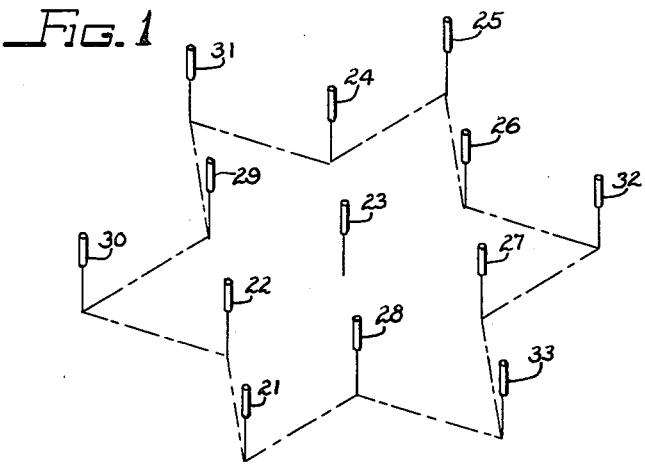
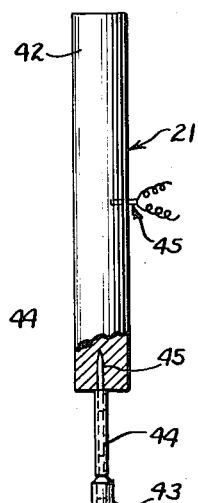
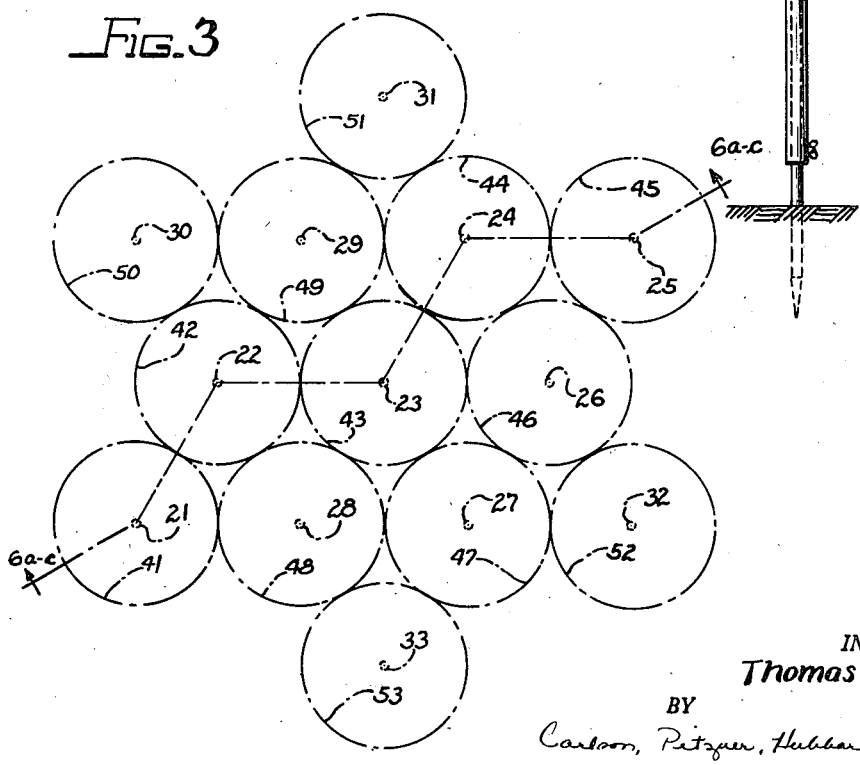
INVENTOR.
Thomas C. Poulter
BY
Carlson, Pitzner, Hubbard, r Wolfe
Attys.

Oct. 28, 1952 — T. C. POULTER — 2,615,524
SEISMIC EXPLORATION EMPLOYING ELEVATED CHARGES
Filed July 2, 1949 — 5 Sheets-Sheet 2
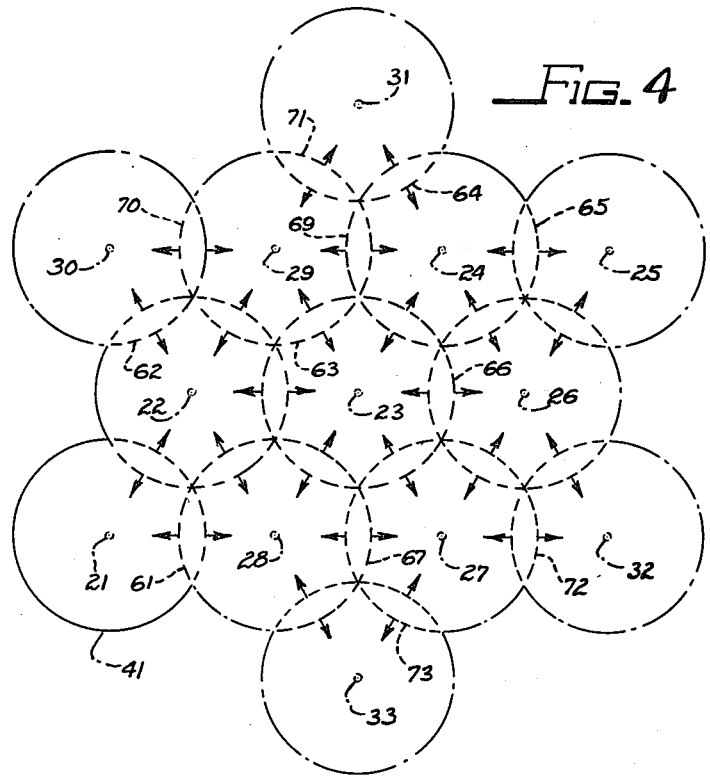
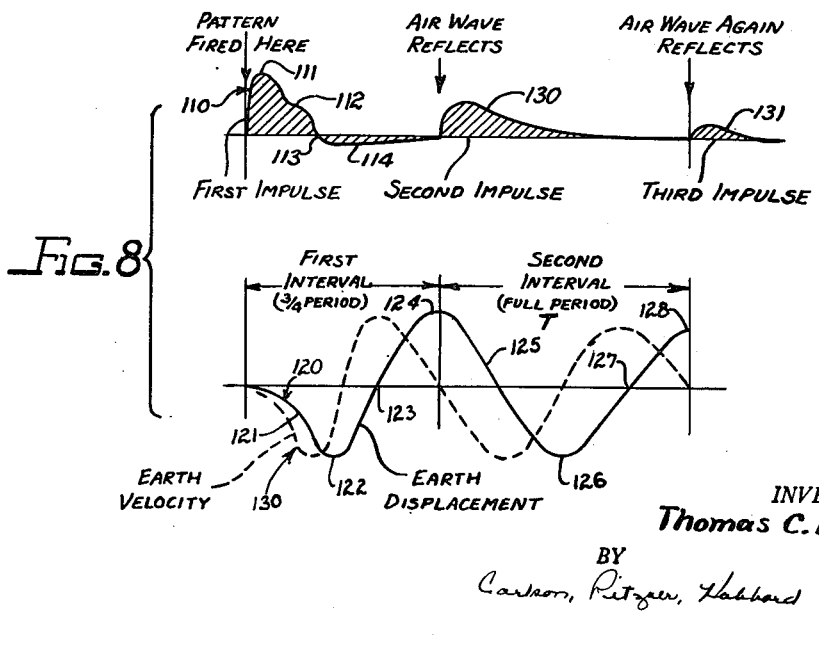
INVENTOR.
Thomas C. Poulter Oct. 28, 1952          T. C. POULTER          2,615,524
SEISMIC EXPLORATION EMPLOYING ELEVATED CHARGES
Filed July 2, 1949          5 Sheets—Sheet 3
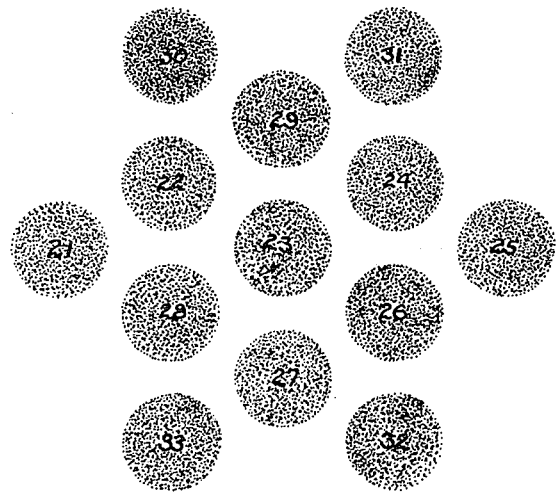
Fig. 5a
PRIMARY AREA OF FIRST IMPACT
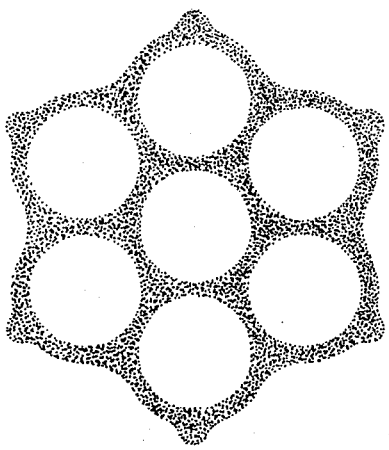
Fig. 5b
PRIMARY AREA OF SECOND IMPACT
Fig. 5c
PRIMARY AREA OF THIRD IMPACT
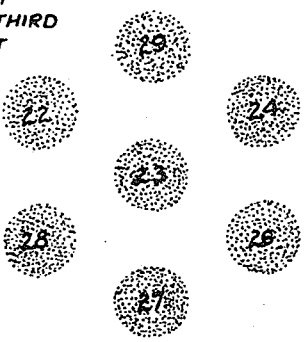
Inventor
Thomas C. Poulter
by:
Carlson, Pitzner, Hubbard & Wolfe
attys.

Oct. 28, 1952           T. C. POULTER           2,615,524
SEISMIC EXPLORATION EMPLOYING ELEVATED CHARGES
Filed July 2, 1949           5 Sheets—Sheet 4
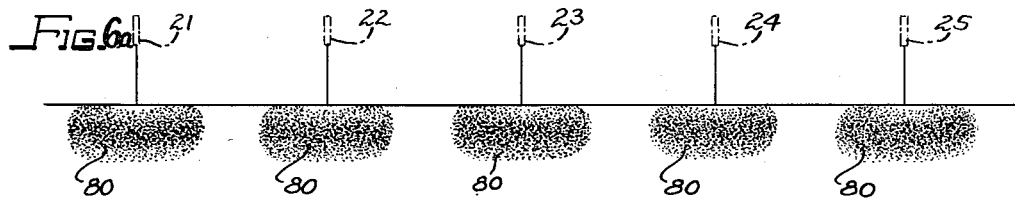
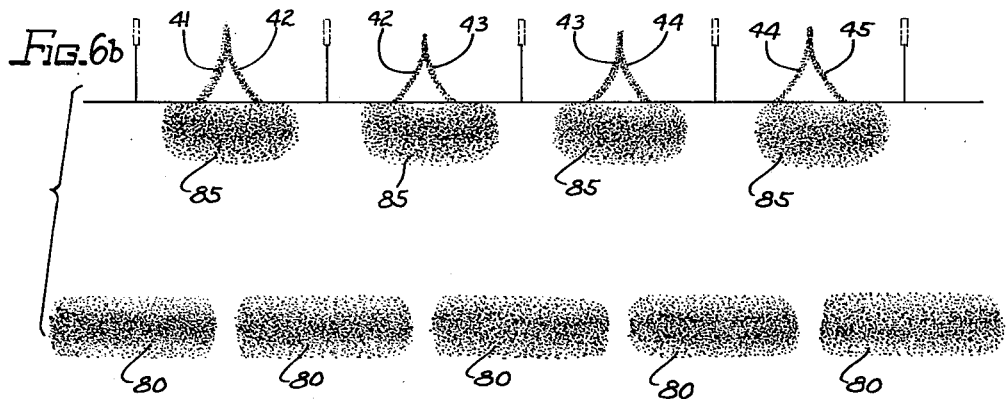
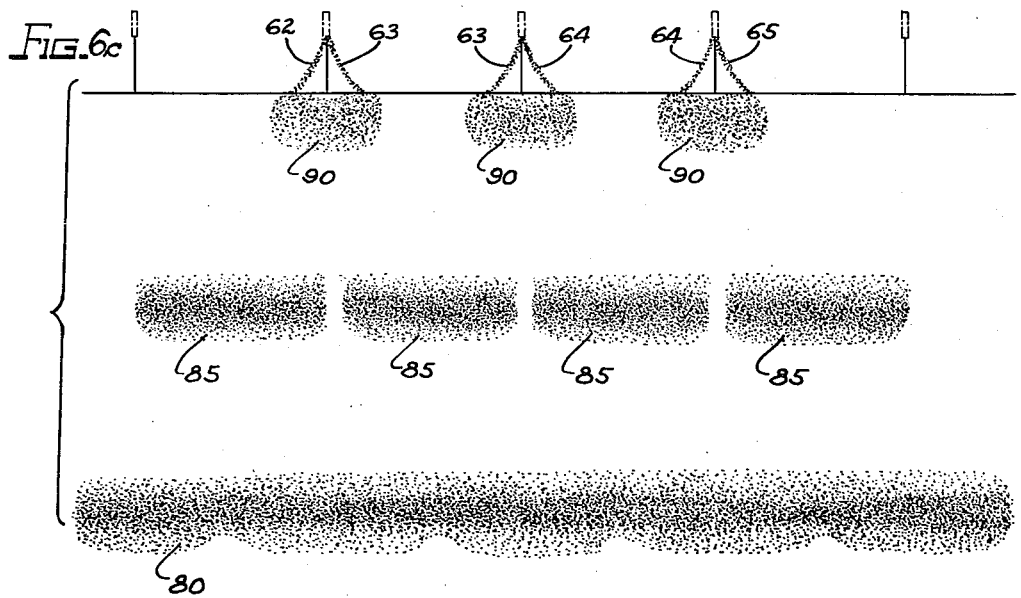
Inventor
Thomas C. Poulter
Carlson, Pitzner, Hubbard & Wolfe
attys.

Oct. 28, 1952   T. C. POULTER   2,615,524
SEISMIC EXPLORATION EMPLOYING ELEVATED CHARGES
Filed July 2, 1949   5 Sheets-Sheet 5

INVENTOR.
Thomas C. Poulter
BY
Attys.

Patented Oct. 28, 1952

2,615,524

UNITED STATES PATENT OFFICE 2,615,524

SEISMIC EXPLORATION EMPLOYING ELEVATED CHARGES

Thomas C. Poulter, Palo Alto, Calif., assignor to Institute of Inventive Research, San Antonio, Tex., a trust estate of San Antonio Application July 2, 1949, Serial No. 102,823

12 Claims. (Cl. 181—0.5)

The present invention relates to geophysical exploration and more particularly to the formation of an improved seismic wave for obtaining reflections from submerged horizons.

It is the general object of the present invention to provide an improved method and charge array for producing successive impulses on the earth which are so timed as to be effective to set up in the earth seismic waves which have a period corresponding substantially to the natural period of earth vibration.

It is another object of the present invention to provide an improved method and apparatus for generating in the earth a plurality of substantially flat wave fronts with a timed interval between them which substantially matches the natural period of the earth in the region under study and which results not only in improved energy transfer to the earth but efficient transmission therein. It is a related object of the invention to provide an improved method of utilizing explosive to permit penetration to deeply submerged layers with minimum attenuation and using a total weight of explosive which is much smaller than that employed in conventional seismic practice.

It is a further object to provide an arrangement of spaced explosive charges above the surface of the earth capable of giving rise to a succession of impulses coordinated in a novel manner with the observed natural period of the earth and resulting in oscillograph traces in which distortion and extraneous vibrations are substantially reduced and interpretation greatly simplified. It is a more detailed object of the invention to provide a charge array and method of employing the same which makes use of the disturbances created at the surface of the earth by the interaction of the shock wave fronts set up by adjacent explosive charges.

It is still another object to provide an improved explosive charge array and method of use which is well adapted for obtaining reflections from horizons submerged under water without endangering the fish and other animal life or plant life in the water, and similarly well adapted for propagating a seismic impulse through snow, loose earth, sand or other granular surface media difficult to penetrate by ordinary means.

Other objects and advantages of the invention will become apparent as the discussion proceeds taken in connection with the accompanying drawings, in which:

Figure 1 is a perspective of an array of charges utilized in practicing the present invention.

Fig. 2 shows a preferred form of charge assembly for use in Fig. 1.

Fig. 3 is a stop motion plan view of the charge array of Fig. 1 showing the beginning of the collision between the laterally expanding shock wave fronts set up by each of the charges.

Fig. 4 is a view similar to Fig. 3 showing the shock wave fronts as they exist a short time later and prior to a second collision.

Figs. 5a and 5b and 5c show the primary areas over which the three impulses are respectively applied to the earth.

Figs. 6a, 6b and 6c inclusive are a sequence of diagrams to show the successive positions of the seismic wave fronts set up by the array of Fig. 1.

Figure 7:
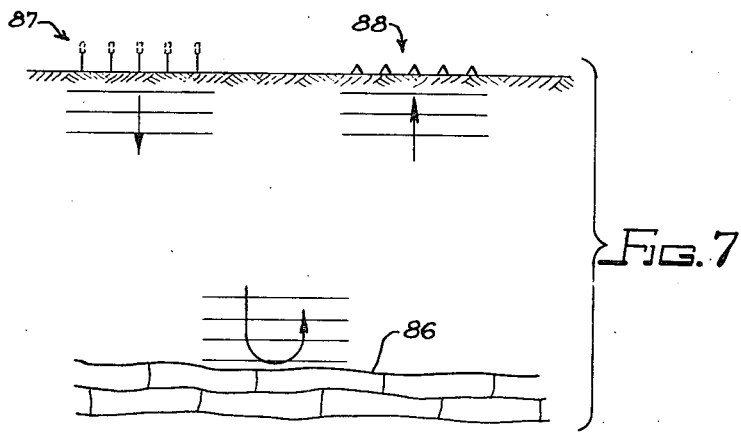

Fig. 7 shows in simplified form the complete path of the wave fronts in Figs. 6a–6c.

Fig. 8 is a diagram showing the relationship between the desired earth movement and the relation thereto of successive impulses striking the earth upon firing the array.

Figure 9:
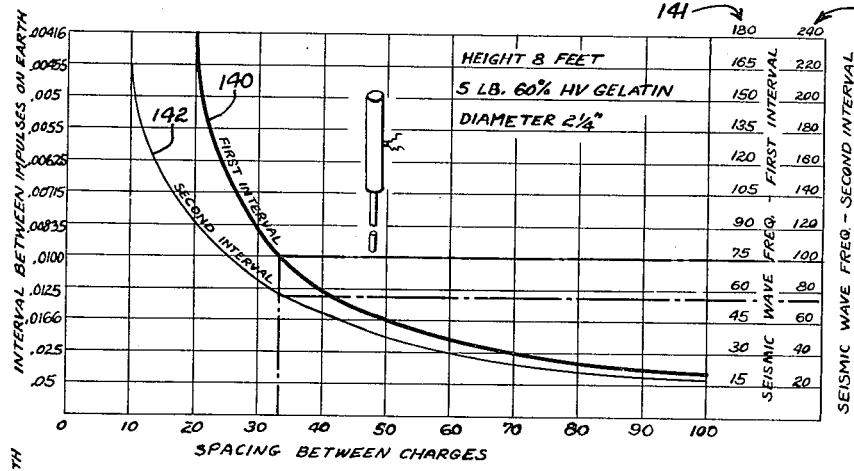

Fig. 9 is a graph showing the manner in which the frequency of the seismic wave varies with the lateral spacing between the charges.

Figure 10:
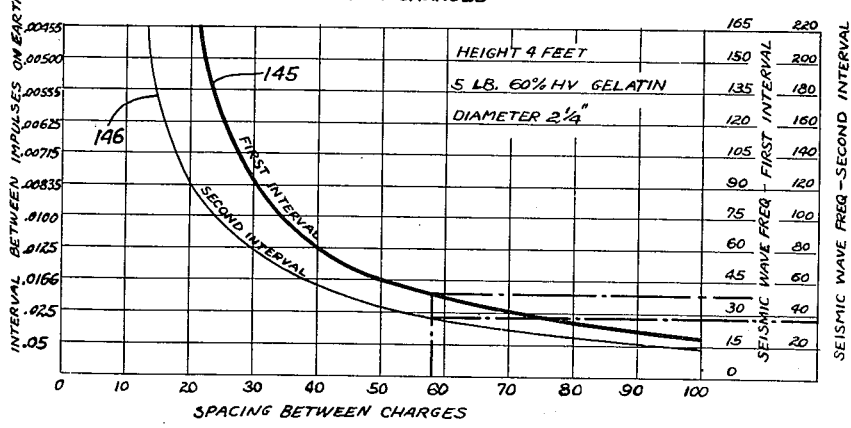

Fig. 10 is a graph similar to Fig. 9 except that the charges are arranged at a lesser height.

While the invention is susceptible of various modifications, I have shown in the drawings and will herein describe in detail only certain embodiments of the invention. It is to be understood, however, that I do not intend to limit the invention by such disclosure, but aim to cover all modifications and alternative devices and methods falling within the spirit and scope of the invention as expressed in the appended claims.

In my concurrently filed application Serial No. 102,821, there is disclosed a charge array capable of applying to the earth a piston-like pressure thrust for setting up a relatively flat seismic wave front in the earth. The spacing between the charges employed in the charge array disclosed in such application is preferably rather small being on the order of 10 to approximately 30 feet. In general the charges are spaced sufficiently close together so that the wave fronts and high pressure gas generated by adjacent charges merge with one another so as to produce reinforcement and equalizing of the pressure applied to the earth. In practicing the invention covered by such application, the duration of the impulse applied to the earth is on the order of one-fourth of the natural period of earth vibration over the reflection path.

My observations have shown that when charges are fired in a pattern a short distance above the earth at spacings greater than approximately 30 feet and up to 80 or 90 feet the charges do not apply a single pulse of force to the earth distributed over the entire pattern area. Instead, the firing of a single pattern produces a sequence or series of impacts which occur alternately in the regions of the charges and at points lying between adjacent charges. The effect in the earth is to produce a short succession of wave fronts rather analogous to a radar pulse. I have found that the charges may be so arranged, and in particular so spaced, as to react upon the earth in a manner which is coordinated in a novel fashion with its natural period of vibration. By so doing the successive wave fronts instead of confusing the geophone record are found to establish a well shaped wave of such frequency as to enable penetration to great depths. Even when using extremely small charges, seismograms may be obtained which greatly exceed in clarity and ease of interpretation those obtainable by conventional techniques. In the discussion which follows the "natural period of vibration" corresponds to the frequency most readily transmitted by the earth over the reflection path.

Turning now to Figure 1 there is disclosed a charge array of a type which may be employed in the present invention consisting of thirteen charges arranged in a star pattern equidistant from one another. These charges are designated 21—33 respectively. Individual charges are elevated above the earth as shown in greater detail in Fig. 2. The charges are so proportioned as to give rise to a strong laterally-expanding shock wave and the bottoms of the charges are left relatively unobstructed so as not to impede to any substantial extent the projection of energy directly downwardly from the charge. In the preferred embodiment each of the charges is cylindrical in shape as indicated at 42 and is supported on a vertical post 43. Extending upwardly from the post is a cardboard ferrule 44 supporting a pointed wooden dowel 45 on which the charge is impaled. The post 43 consists of two portions telescoped together so that the height of the charge above the surface of the earth may be readily adjusted. The charge is detonated by a seismic cap 45 preferably placed at the center of the charge. The explosive may be any type capable of giving rise to a high velocity shock wave such as TNT, RDX, 60% HV seismograph gelatin or the like.

In accordance with the present invention the charges in the array are so spaced from one another that the shock wave set up by the charges upon simultaneous firing exert a first impulse on the earth in the region directly below each of the charges and a second impulse at the regions between adjacent charges and resulting from the interaction of the shock wave fronts, the interval between the impulses being coordinated with the natural period of vibration of the earth. More specifically, the charges are arranged in a pattern equidistant from one another at such spacing that the second impulse caused by the collision and reflection of the shock waves occurs after an interval which is substantially equal to three-fourths of the natural period of earth vibration over the desired reflection path. Further, in accordance with the invention, a third reflective impulse is produced after a second interval approximately equal to the natural period of the earth.

The manner in which shock wave reflection as taught herein produces a second impulse on the earth and, under normal circumstances, even a third, will be apparent upon inspection of the plan views of the expanding shock waves shown in Figs. 3 and 4 and the area diagrams 5a—5c. Upon firing the charges simultaneously a shock wave proceeds downwardly from each of them striking the earth over a number of circular areas. As indicated in Fig. 5a, the primary areas of impact are quite large, on the order of several thousand times the area of the lower end of the charge. This results in a distributed application of wave energy to the earth, the intensity level of the wave being reduced to a point where the shock wave is converted to a seismic wave at relatively high efficiency. In this way I take advantage of the elastic qualities of the air and the peculiar transmission characteristics of the granular weathered layer as described more fully in my copending application Serial No. 29,307 filed May 26, 1948.

The explosion also causes a large portion of the energy to be directed laterally. Referring now to Fig. 3, each of the charges 21—33 shown in plan view sets up a symmetrically-expanding shock wave front which travels through the air at supersonic velocity. These shock waves, which have been designated 41—53 respectively, proceed laterally until they come into contact with the shock waves set up by the neighboring charges. This is the situation which is illustrated in the figure. The velocity of the wave will be initially the same as the rate of propagation of the detonation wave within the body of the charge. This will depend upon the specific type of explosive employed and may range from approximately 10,000 to approximately 28,000 feet per second. As the wave spreads out, its velocity decreases. In the case of five-pound charges having a detonation rate of 18,000 feet per second the velocity will normally fall to about 2,000 feet per second after traveling a distance of 10 to 15 feet and the average velocity over a distance of 20 to 30 feet is approximately 2,000 feet per second. At distances greater than this, say 40 feet, the velocity may fall to a value which is greater than, but which approaches, the normal velocity of sound. The velocity which is effective at various spacings from the charge may be readily ascertained by simple measurements made with conventional pickup and interval-measuring apparatus and the average velocity over the distance simply computed.

It might be expected that the shock waves upon striking one another would continue in the same direction, one passing through the other. Instead, each shock wave acts as an efficient reflecting surface for an oncoming shock wave having substantially the same velocity and intensity. Because of the convexity of the shock waves, the reflection does not occur instantaneously but is distributed over a very short time interval. As we have seen, the beginning of the reflection is illustrated in Fig. 3. Additional expansion of the wave fronts causes reflection to progress until it reaches the condition set forth in Fig. 4. At this instant reflection has just terminated at points centered within the triangles formed by three adjacent charges. In order to obtain a clearer physical picture of Fig. 4, the reflected waves which have, so to speak, been turned inside-out are designated by the numerals 61—73 respectively, and have been marked with arrows to indicate direction of propagation.

Since the wave movement of which we have been speaking occurs parallel to the earth's surface, one might assume that there would be little if any force applied to the earth. This is largely true as regards the interval between the direct impact with the earth and the beginning of the reflection process. This is a time of relative quiet during which a minimum of seismic disturbance is set up. However, upon collision and reflection of the waves it is found that a large portion of the wave energy is applied to the earth. The large magnitude of the force is believed due to the fact that the shock waves set up by each of the charges in the array are not cylindrical as one might assume from the plan view but bowl-shaped. The exact nature of the reflection phenomenon is not perfectly understood. It seems clear, however, that reflection of these "bowls" upon one another sets up a horizontal wave front which is projected practically straight down and which covers a large total area at regions lying symmetrically between the charges. This area, as illustrated at 74 in Fig. 5b, is in the form of a network or grid. It further appears that the horizontal wave front is followed by a downward rush or "slipstream" of air at high velocity which causes the energy imparted to the earth to be augmented and sustained over a rather definite time interval. When the downwardly traveling wave front strikes the surface, it causes the surface to move and sets up a seismic wave. As in the case of the seismic wave previously generated under the charges, the energy level is such that the transformation takes place efficiently in the granular earth material, and the second seismic wave proceeds downwardly through the earth following the first.

Movement of the reflected shock wave after the first reflection continues in the direction of the arrows in Fig. 4 until a second collision takes place. For reasons of symmetry it will be apparent that the second collision will be focused at the same regions at which the charges were initially fired and particularly at the charges 22—24 and 26—29 (see Fig. 4) which form the central group of seven charges. This collision acts in a manner similar to the first collision to set up an air wave front which is projected downwardly over the areas indicated in Fig. 5c to form a third seismic wave in the earth. The latter is, of course, at a much lower intensity than the first two since the shock wave front has by now practically expended its energy. To bring out this fact the stippling has been graduated in accordance with intensity in Figs. 5a–5c.

Considering that the areas over which the impacts occur are not continuous over the entire pattern, it might be doubted that the present arrangement of charges would be capable of setting up flat and continuous seismic wave fronts. That the resulting wave fronts are substantially plane can, however, be demonstrated very simply in an actual setup by burying a pattern of closely spaced geophones arranged at a constant depth and measuring both intensity and time of arrival of the seismic disturbances. The results of such tests show that for spacings between 30 and about 80 feet the seismic wave fronts become not only plane but virtually continuous by the time they reach a depth of 20 to 30 feet. The manner in which this occurs may be visualized by inspection of Figs. 6a, 6b and 6c which are elapsed time diagrams showing the generation of the wave fronts by the pattern of Fig. 1. The charges 21—25 indicated in these figures by the dot-dash outline are those which lie along the section line 6a–c—6a–c in Fig. 3. Because of space limitations the charges are shown more closely spaced than they would be in an actual setup where the spacing would normally be between about 30 and 90 feet.

At the instant of time illustrated in Fig. 6a it is assumed that the pattern has just been fired and that the shock waves striking the earth in the region below the charges have set up seismic wave fronts 80. Although detached, it is important to note that they are in horizontal alinement. The wave fronts are compressional in nature with the intensity indicated by the denseness of the stippling. The wave front 80, upon passing downward into the earth soon assumes the condition shown in Fig. 6b where the adjacent edges are practically joined. By this time also the shock waves in the air have collided, as indicated for example at 41, 42, to set up the second seismic wave front 85. Although this is shown as a series of disconnected sections, it will be understood that the wave front is initially in the form of a network, appearing in plan view about the same as the area of impact shown in Fig. 5b. As this wave front 85 moves down into the position shown in Fig. 6c, the openings fill in and it becomes substantially plane and continuous. Simultaneously the reflected air waves undergo a second reflection as shown at 62, 63 setting up the third wave front 90. The latter, too, becomes more completely formed as it moves downwardly but since the process is clear from consideration of the seismic wave fronts 80 and 85, no additional showing is necessary. The successive positions of the wave fronts both before and after reflection from a submerged horizon 86 are shown in Fig. 7, the shotpoint being designated 87 and the geophone spread 88.

While Figs. 6a–6c are diagrammatic and intended only to illustrate the principles involved in the present invention, they are nevertheless based upon observed data. For the purpose of following the air shock wave, a high speed motion picture camera was used, the camera being adjusted to take pictures at a rate of about 3000 frames per second. Charges were arranged in line about 100 feet in front of the camera and extending across the field of view. A backdrop was constructed consisting of canvas ribbon several hundred feet long and eight feet wide having a simple grid design covering the entire surface. Passage of a shock wave is readily noticeable because of the refraction of the light passing through the air to the camera producing clear and unmistakable distortion of the grid lines. When the pictures are projected at normal viewing speed, the ripples spreading outwardly from the respective charges appear to pass through one another. However, from a consideration of the laws of conservation of mass, momentum and energy, this cannot happen and it becomes apparent that what is being observed is, in fact, collision and reflection. The progress of the shock wave in a direction toward the camera may be observed by the collapsing effect of the wave on a series of inflated rubber balloons. During the tests the charges were fired simultaneously using seismograph caps with a high capacity condenser included in the firing circuit to insure that all the caps are exploded at precisely the same instant.

The net effect of the foregoing may be more clearly visualized by picturing the firing of a first pattern of charges followed after a timed interval by the firing of a second pattern of charges located along the grid-shaped boundaries of the charges in the first pattern followed, in turn, by the firing of a third pattern of smaller charges coincident with the charges of the first pattern.

In practicing the invention, the charges are so placed relative to one another that the initial reflection of the shock waves set up thereby takes place after an interval which is three-fourths of the natural period of earth vibration over the reflection path. Information on the natural period may be obtained by studying seismograms previously obtained in the area. I prefer, however, to determine this data just prior to the shooting by establishing a shot point and geophone spread and making a test shot without using filtering on the recording unit except as may be necessary to filter out low frequency surface waves. The test shot is preferably accomplished by firing one or more charges in the air a short distance above the earth. The resulting traces will be found to have a predominant period of vibration which may be read off directly merely by observing the distance (expressed in units of time) between adjacent peaks on a given trace. It will be found in practice that the period is not constant, but varies from point to point along the trace. For maximum accuracy, therefore, the period is read from that portion of the trace which shows the desired reflection either clearly or indistinctly. If no reflections are indicated, the average period over a chosen range of depth may be used. When making a number of shots in the same general area, for example, when running a continuous survey, no test shots as such will be required. Instead, the natural period of the wave applicable to a particular depth may be observed on the trace resulting from the previous shot.

The significance of the ratio of 3:4 employed herein may be clearly understood by reference to Fig. 8 which is a graph of applied force and of the displacement and velocity of the earth which results. At the top of this figure the curve 110 indicates the pressure exerted by the air-borne wave as a function of time. It will be noted that the pressure rises to a peak as indicated at 111, drops to a lesser but sustained value 112 and then passes through zero as indicated at 113, subsequently going below atmospheric to apply a vacuum to the earth as indicated at 114. Turning attention to the lower portion of the figure, it will be assumed that the pattern is fired when the earth is at rest and the elapsed time is zero. The shock wave arriving directly from each of the fired charges strikes the earth below the charges setting it in motion. The movement of the earth with respect to time is shown by the curve 120. As indicated by the initial portion 121 of the curve, pressure causes the earth to move downward. For best results the pressure should be applied three-sixteenths to one-fourth of the natural period of earth vibration after which it is replaced immediately by vacuum. The natural period is indicated at T in Fig. 8. After the pressure is relieved, the earth continues to move slightly due to its momentum, reaching a maximum downward displacement as indicated at 122. The velocity in the interim increases and again becomes zero as indicated by the dashed curve 130. Since even the weathered layer is quite elastic at low amplitudes, it will rebound upwardly assisted by vacuum, following the portion 123 of the displacement curve until it reaches a maximum upward displacement 124.

With the charges spaced in accordance with the invention, the shock waves from adjacent charges reflect upon one another at this time to produce a downward thrust on the earth over the area outlined in Fig. 5b. The approximate magnitude and duration of this thrust is indicated at 130 in Fig. 8. The resulting downward earth movement follows the displacement curve as indicated at 125 until the earth reaches a second low point 126. At this point rebound again occurs and the earth reverses its direction moving upwardly along the portion 127 of the curve reaching a second high point 128. In carrying out the invention the second reflection is caused to take place at this time so that a third impact 131 is applied to the earth and it is again forced downward. It will be noted in the figure that the reflections do not take place instantaneously but are spread over a time interval. In this way the force-time product or "impulse" may be quite high even though the force itself is relatively low.

From the foregoing it will be apparent that the first interval, namely, that between the initial firing and the first reflection is, according to my teachings, three-fourths of the natural period of the earth while the second interval between the first reflection and the second reflection is equal to the natural period of the earth. However, because of the fact that the third impact is of low intensity as compared to the first two impacts, the first interval will be given primary consideration.

Since the velocity of the shock wave varies with distance, it is not practicable to compute theoretically the spacing which is required for a given seismic frequency. Instead, a curve may be made from observed data with spacing plotted against time interval, the height, size and weight of charge, type of explosive, and cap placement all being held constant.

Such a curve is shown at 140 in Fig. 9 using the spacing between the charges as the abscissa and interval as the ordinate the latter increasing from top to bottom for the sake of convenience. To make the curve useful in carrying out the invention, the interval ordinates are first inverted to convert them to frequency (the so-called "air" frequency) and then multiplied by the factor 3/4 to obtain the corresponding seismic frequency. The resulting ordinates 141 are labeled "Seismic wave frequency—first interval" in Fig. 8. The manner in which this curve may be used is readily understood by assuming that a seismic wave of 75 vibrations per second is required. This information is obtained from a test record or other trace previously recorded in the immediate vicinity. The frequency of the wave is, of course, merely the inversion of the period or time between successive crests. The curve 140 shows directly that the desired frequency can be obtained by a setup in which the charges are arranged 34 feet from one another.

As noted in connection with Fig. 8 the interval between the second and third thrusts on the earth is employed to impart additional energy to the seismic wave in proper phase relation. To this end the second interval is plotted against spacing as indicated at 142, the same coordinates being used in plotting as were used in plotting curve 140. The ordinates are inverted to convert them to frequency as indicated at 143 "Seismic wave frequency—second interval." No multiplication by 3/4 is required, however, since the earth is by this time already in motion and one cycle of vibration in the air corresponds in phasing to a cycle in the earth. The significance of curve 142 may be checked by assuming that a spacing of 34 feet is used (such value having been found by using the first curve 140) and observing the frequency which tends to be set up by the period interval. Curve 142 tells us that the second interval will also produce a seismic frequency of 75 vibrations per second. In the present example, therefore, all three impacts contribute to a well-formed seismic pulse.

It will be apparent from Fig. 8 that for proper timing of the third impulse in accordance with my teachings the shock waves set up by the charges should travel from the point of origin to a first collision in just three-fourths of the time that they require to return to the point of origin. At first this might seem a condition impossible of fulfillment since the distance is obviously the same whether the wave travels in one direction or the other. I have found, however, that using average explosive charges in the range of 1 to 10 pounds weight and spaced about 30 feet or more the shock wave slows down sufficiently in its course of travel so that this condition is at least approximately met.

If further accuracy is desired so that maximum energy is imparted to the earth, it is possible to achieve it by varying the height of the charge, keeping other things constant. A lesser height has the effect of shortening the first interval relative to the second, in other words, tends to spread the curves farther apart from one another. The effect of reducing the elevation to four feet while keeping other factors constant will be seen by referring to the graph of Fig. 10 where the curve corresponding to the first interval is designated 145 and that corresponding to the second, 146. As a result of the increased spread between the two curves the optimum charge spacing is higher than in Fig. 9. It will be noted for example that at a spacing of 55 feet both the first interval and the second interval produced seismic wave frequencies of approximately 38 cycles per second. As a matter of fact, using the charge setup which corresponds to Fig. 10 the third earth impulse defining the second interval adds energy which is at least approximately in proper phase relation for all charge spacings greater than 40 feet.

It will be apparent that graphs of the type shown in Figs. 8 and 9 may be readily prepared for a number of other heights within the range of 3 or 4 feet to about 20 feet. Using such graphs as worksheets the problem of determining the spacing and height for the frequency most readily transmitted is reduced to a simple matter. Knowing the desired frequency the charge spacing corresponding to the "first interval" and "second interval" curves may be read off directly. The graph in which the spacings indicated by the two curves coincide most closely then corresponds to the elevation which should be employed.

It will be apparent to one skilled in the art that the invention is not necessarily limited to employing graphic aids of the type disclosed in Figs. 9 and 10 but would also include the use of other types of curves or the like giving information on spacing where the first interval is related to the natural period of the earth by the ratio 3:4 and the second by a ratio of about 1:1.

One of the premises on which the above discussion of the invention is based is that the first two impulses which set the earth in motion are spaced more closely than the period of the desired wave. However, subsequent impulses which are applied to the earth when it is already in motion are applied in synchronism with earth vibration. It must be kept in mind, however, that the first and second impulses are not applied at the same location, the first impulse being applied primarily under the charges and the second at the boundary regions between the charges. This might lead one to question the theory advanced herein on the basis that the entire area of earth covered by the pattern is not set into motion at the same time as the curves of Fig. 8 would indicate. As a matter of fact one can argue based on purely theoretical considerations that the present method is basically inoperative and endeavors along this line therefore futile. The fact of the matter is that field studies have confirmed the practicality of the present procedures. While the theory is not as yet thoroughly understood, the indications are that the surface of the earth behaves in a manner somewhat analogous to a drumhead, an impulse applied at spaced points being sufficient to set the whole area in rather uniform downward motion.

The advantages of the present procedure are manifold. One advantage resides in the fact that the seismic frequency set up may be varied without guesswork to accommodate the wide range of frequencies characteristic of various regions of the earth, even upward of 100 cycles per second peculiar to structure in and surrounding beds of ore. Shot holes are eliminated, along with the expense and difficulty of operating drilling equipment, especially in foreign countries. The operating procedure is then speeded and the shooting party can work more closely with the surveying party. The explosion does not damage or alter surface structure and consequently any desired number of shots may be made at the same location with perfect reproducibility. Hazard to buildings or other structures is greatly reduced due to the substantial absence of ground roll. As a result of the foregoing the cost per mile of subsurface information may be reduced to well below that of conventional seismic methods.

Since the energy is concentrated at a certain frequency or narrow band of frequencies it will be understandable that less explosive is necessary than when using a brute force technique in which energy is spread over a wide spectrum ranging all the way from high amplitude ground roll at 10 or 15 cycles per second to the extremely high frequencies resulting from the rush of gasses in the shot hole. If desired a filter passing the frequency of primary interest may be used at the recording unit. Very little mixing or compositing will be found to be necessary.

In the claims reference to a short distance above the earth will be taken to mean an elevation of about 4 to about 20 feet although satisfactory results will normally be obtainable within a range of 8 to 12 feet. The elevation should be low enough so that the geophone spread, spaced to pick up reflections, receives such reflections for recording prior to the receipt of the direct air wave from the explosion. By appropriate location of spread the present array is also suitable for refraction shooting.

I claim as my invention:

1. The method of seismic exploration which includes the steps of setting up a plurality of charges spaced substantially equidistant from one another above the surface of the earth, the spacing being such that shock waves emanating from adjacent charges upon firing strike the earth below the charges to produce a first impact on the earth and then collide and reflect on one another to produce a second impact on the earth after an interval substantially equal to three-fourths of the natural period of earth vibration and with the charges at such height that the reflected shock waves again collide and reflect after a second interval substantially equal to the natural period of earth vibration, firing the charges simultaneously, and receiving the seismic wave fronts resulting therefrom after they have been transmitted through the earth.

2. The method of seismic exploration which includes the steps of setting up a plurality of charges spaced equidistant from one another a short distance above the surface of the earth, the spacing being such that the shock waves emanating from adjacent charges upon firing act directly on the earth to produce a first wave front therein and subsequently collide and reflect upon one another to produce a second wave front in the earth spaced from the first by a time interval which is equal to the period of the vibration most readily transmitted over a desired seismic reflection path, firing said charges simultaneously, and receiving the resultant seismic wave after transmission over said reflection path.

3. The method of seismic exploration which includes the steps of setting up a pattern of similar charges spaced equidistant from one another above the surface of the earth, setting up a geophone spread remotely from the pattern, the spacing being such that the shock waves emanating from adjacent charges upon firing thereof collide and reflect at the boundaries midway between the charges to produce an impulse on the earth after an interval substantially equal to three-fourths of the natural period of earth vibration along the reflective path between the pattern and the geophone spread, firing the charges simultaneously, and receiving the seismic wave resulting therefrom after reflection from a submerged horizon.

4. The method of seismic exploration which includes the steps of setting up a pattern of similar charges spaced from one another above the surface of the earth, setting up a geophone spread at a point remote from the charge pattern, the spacing and elevation of the charges being such that the shock waves emanating from adjacent charges upon firing not only act directly on the earth to produce a substantially flat first wave front therein but also collide and reflect at the boundaries midway between the charges to produce a second substantially flat wave front in the earth spaced from the first by a wavelength corresponding to the observed natural period of earth vibration along the reflection path between pattern and spread, firing the charges simultaneously, and receiving the wave resulting therefrom after reflection from a submerged horizon.

5. An explosive setup for seismic exploration which comprises a plurality of explosive charges elevated in a two-dimensional pattern above the surface of the earth and offering substantially no obstruction to the passage of a shockwave downwardly and laterally from each of them, said charges being equidistant from one another and arranged at the same elevation, the spacing of the charges being such that in addition to the impulse applied to the earth directly below the individual charges there is an additional impulse at regions intermediate the charges and at a later time which is substantially three-fourths of the natural period of earth vibration, said charges being arranged at such height that there is a third impulse applied to the earth after an additional interval which is at least approximately equal to the natural period of earth vibration, and means for firing said charges simultaneously.

6. The method of seismic exploration which includes the steps of arranging a pattern of charges spaced substantially equidistant from one another at a short distance above the surface of the earth with a spacing and elevation such that upon firing the wave fronts emanating from the charges apply a downward force on the earth which persists for a duration of approximately one-fourth of the natural period of earth vibration in the region under study and such that the laterally-expanding wave fronts therefrom collide and reflect at the boundary regions between the charges to produce a force on the earth at such boundary regions after an interval substantially equal to three-fourths of said natural period of earth vibration, firing the charges simultaneously, and receiving the seismic wave resulting therfrom after it has been transmitted through the earth.

7. The method of seismic exploration which includes the steps of observing the period of seismic disturbance most readily transmitted by the earth in the region under study, setting up a pattern of charges spaced substantially equidistant from one another and elevated a short distance above the surface of the earth, the spacing being such that the wave fronts emanating from adjacent charges upon firing thereof collide and reflect at the boundaries midway between the charges to produce an impulse on the earth after an interval substantially equal to three-fourths of the most readily transmitted seismic disturbance, firing the charges simultaneously, and receiving the resulting seismic wave after the same has been transmitted through the earth.

8. The method of seismic exploration which includes the steps of observing the period of seismic disturbance most readily transmitted by the earth in the region under study, setting up a pattern of explosive charges elevated a short distance above the surface of the earth of such size and so spaced from one another that the wave front emanating therefrom causes a first impulse to be applied to the earth directly below the charges and a second impulse to be applied at the boundaries midway between the charges after a time interval substantially equal to three-fourths of the observed period of earth vibration, setting up a geophone spread at such distance from the pattern so that any reflection of interest arrives at the geophones prior to the air wave from the pattern, exploding such charges simultaneously to produce two successive seismic wave fronts in the earth, and then receiving said reflected wave fronts at said geophone spread.

9. The method of seismic exploration which includes the steps of setting up a pattern of charges laterally spaced from one another at a substantially equal distance above the surface of the earth so that the downwardly projected portion of the wave fronts therefrom upon firing apply a force impulse to the earth over a broad but well-defined area below the respective charges, the charges being so spaced from one another that the laterally-expanding portion of the wave fronts from adjacent charges collide and reflect upon one another to apply a second impulse to the earth after an interval equal to three-fourths of the natural period of earth vibration in the region under study, firing the charges simultaneously, and then receiving the successive seismic wave fronts set up in the earth after they are reflected from a submerged horizon.

10. The method of seismic exploration which includes the steps of arranging a pattern of charges above the surface of the earth, setting up a geophone spread including a broad band recorder unit at a sufficient distance from said pattern so that seismic reflections are received from the pattern prior to receipt of the air wave, firing said pattern, observing the period of the seismic wave recorded at said recording unit, adjusting the spacing of charges in the pattern so that upon firing the downwardly projected portion of the wave fronts apply a pressure impulse to the earth below the charges and the laterally-expanding portion of the wave fronts collide after a time interval of approximately three-fourths of the observed period to apply a pressure impulse to the earth at the boundary regions between the charges, firing the charges simultaneously to set up first and second seismic wave fronts in the earth, and then receiving the wave fronts at the geophone spread after they have been reflected from a submerged horizon.

11. The method of seismic exploration which includes the steps of setting up a pattern of similar charges spaced from one another above the surface of the earth and arranged at the same elevation, setting up a geophone spread at a point remote from the charge pattern, the spacing and elevation of the charges being such that the shock waves emanating from adjacent charges upon firing not only act directly on the earth to produce a first wave front therein but also collide and reflect at the boundaries midway between the charges to produce a second wave front in the earth spaced from the first in time by an interval which is equal to the observed natural period of vibration most readily transmitted along the reflection path between the pattern and the spread, firing the charges simultaneously, and receiving the wave resulting therefrom after reflection from a submerged horizon.

12. A setup for seismic exploration for use where the period of the wave most readily transmitted over a given seismic reflection path is known, which comprises a two dimensional pattern of elongated charges vertically arranged above the earth at the same elevation and with the adjacent charges substantially equidistant from one another, the charges being substantially free of obstruction to the passage of a shock wave downwardly and laterally from each of them, the spacing between the charges being such that upon firing thereof the downwardly projected portions of the respective shock wave fronts apply a first impulse to the earth below the charges and the laterally expanding portions of the shock wave fronts collide and reflect after a time interval of approximately three-fourths of the period of the most readily transmitted seismic wave to produce a second impulse at the boundaries centered between the charges, means for firing the charges simultaneously, and means for receiving the resultant seismic wave after transmission over said reflection path.

THOMAS C. POULTER.

REFERENCES CITED

The following references are of record in the file of this patent:

UNITED STATES PATENTS

| Number | Name | Date |
|---|---|---|
| Re. 17,242 | McCollum | Mar. 19, 1929 |
| 1,509,208 | Hull | Sept. 23, 1924 |
| 2,604,451 | Voorhees | Dec. 15, 1936 |
| 2,379,203 | Vertzinsky | June 20, 1945 |

FOREIGN PATENTS

| Number | Country | Date |
|---|---|---|
| 701,747 | France | Mar. 21, 1931 |

OTHER REFERENCES

Tsvetaev (USSR), "An Experiment of Application of Air Explosions In Reflection Exploration," Article in "Applied Geophysics" 1945 No. 1, pages 82–87. (Copy in 181–0.53B.)